Sept. 1, 1953 H. T. LANGE Re. 23,706

REFRIGERANT EXPANSION VALVE

Original Filed Oct. 9, 1947

INVENTOR

HAROLD T. LANGE

BY Robert B. Terry

ATTORNEY

Reissued Sept. 1, 1953 Re. 23,706

UNITED STATES PATENT OFFICE 23,706

REFRIGERANT EXPANSION VALVE

Harold T. Lange, Webster Groves, Mo., assignor to Sporlan Valve Company, St. Louis, Mo., a corporation of Missouri Original No. 2,573,151, dated October 30, 1951, Serial No. 778,814, October 9, 1947. Application for reissue June 21, 1952, Serial No. 294,953

13 Claims. (Cl. 62—3)

Matter enclosed in heavy brackets [ ] appears in the original patent but forms no part of this reissue specification; matter printed in italics indicates the additions made by reissue.

This invention relates to improvements in refrigerant flow control, and more particularly to means for the regulation of thermostatic expansion valves as employed in systems of compressor-condenser-evaporator type.

In the operation of refrigeration systems, particularly those for space cooling purposes, there has been accepted as inevitable certain undesirable irregularities in the operation of the expansion valve, specifically the effect known as hunting or cycling. The extent of this difficulty depends on many characteristics of valve design, also upon the extent of the refrigerant circuit, the lag through the evaporator and response of a thermosensitive element such as a control bulb, these being but a few of the factors contributing to this operational difficulty. The condition tends to cause unstable evaporator conditions, and thus adversely to affect the compressor due to wide variation and frequency of fluctuations in suction pressures. It is readily realized that if the response of the valve to sudden thermal changes may be delayed, or if the valve be permitted to move only at a reduced rate, the difficulty may be overcome in considerable degree. Various structural proposals for correcting the condition have been proposed and some have successfully accomplished their purpose, among these being an arrangement covered by a copending application of this applicant bearing Serial No. 678,530, filed July 21, 1946, now abandoned, and entitled, "Delayed Action Valve Assembly." While the elements therein disclosed and claimed offer an effective method to overcome the noted difficulties, further experience has shown that equal or better results may be obtained without the addition of moving parts, and at a cost not appreciably greater than that of certain prevailing systems. Accordingly, the present invention has as a principal objective, to overcome, at least substantially, the hunting and cycling effects in a system of the type noted, and to realize this result by a method and structure which do not increase to any important extent the cost of prevalent systems and apparatus.

Besides the objective attainment of an improved method of expansion valve regulation, the present improvements objectively provide a novel control agency for such valves, with the purpose of virtually eliminating hunting effects.

An additional and important object is attained in an improved thermal sensing element for use with the expansion valve of a compressor-condenser-evaporator system, in which the sensing element, such as a feeler bulb, is so formed and of such content that although there is attained a desirable character of response of such element throughout normal operating conditions of the systems, yet markedly differential rates of valve opening and closing response prevail under abnormal operating conditions.

The foregoing and numerous other objects will more clearly appear from the following detailed description of a preferred form and certain modifications thereof, particularly when considered in connection with the accompanying drawing, in which.

Figure 1:
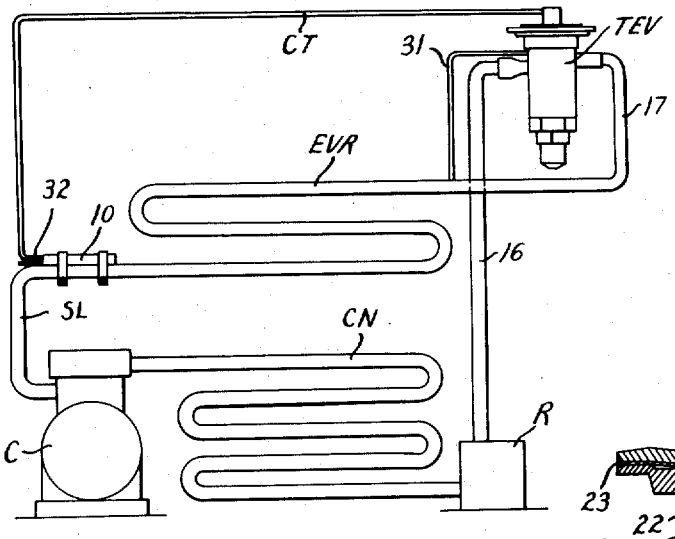
Fig. 1 is a schematic diagram of a refrigeration system embodying the present improvements.

Referring now by characters of reference to the drawing, a typical compressor-condenser-evaporator system is shown diagrammatically by Fig. 1, principally for completeness of disclosure, and includes a compressor C serving to discharge the compressed refrigerant to the condenser CN, the latter in turn delivering into a receiver R, whence the liquid is delivered to a thermostatic expansion valve TEV, controlling the flow of refrigerant to an evaporator generally indicated at EVR. As is usual in a system of this type, the evaporator is connected through the suction line SL back to the intake side of the compressor C.

For control of the expansion valve a bulb 10 is employed, which according to present improvements is modified somewhat as to its content, and in one embodiment, to some extent in its structure. The chamber within the bulb 10 is connected as through capillary tubing CT to a diaphragm chamber in the valve assembly proper, as will later appear.

The thermostatic expansion valve is or may be of itself of a known commercially successful type, and includes a body forming an enclosure which is in the nature of a housing, casing or barrel, within which is reciprocally movable a valve guide 12, axially of which is carried a valve member 13 operable to open and close a valve seat 14.

The seat is formed on a replaceable threaded element 15 provided with a bore or flow passage therethrough. It will now be apparent that throttling movements of the valve control the flow of liquid through the inlet tubing and a connection 16 to an outlet fitting 17 connected to the evaporator EVR.

Figure 2:
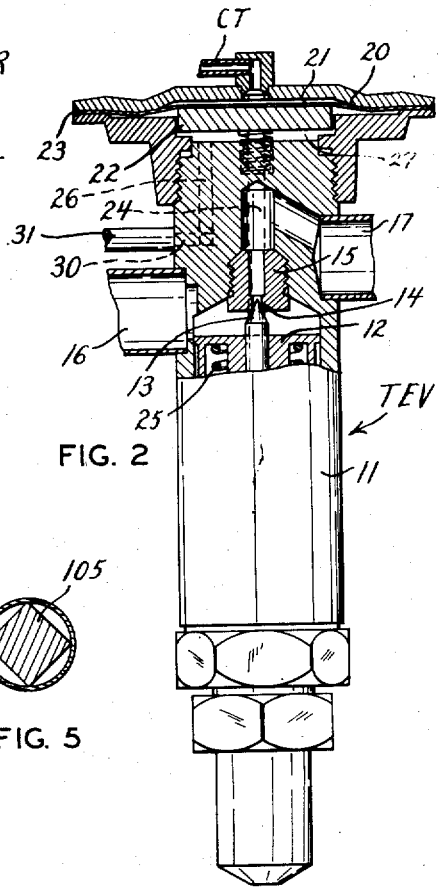
Fig. 2 is an enlarged side elevation, partly in section, showing a thermostatic expansion valve suitable for use with present improvements.

As is usual in thermostatic expansion valve assemblies there is provided an expansible element such as a diaphragm 20, capable of flexing action in or adjacent a diaphragm chamber 21, under the influence of volume changes occurring by reason of thermal effects imparted to the bulb 10 in response to changes in superheat in the suction line SL. As a backing for diaphragm 20 there is employed a follower plate 22, the diaphragm being peripherally sealed as by silver solder in a peripheral solder seat 23 between the companion parts of the diaphragm enclosure. Motion of the diaphragm and follower is imparted to the guide 12, hence to valve 13, through a plurality of push rods, only one of which is shown and indicated at 24 in dotted lines. Thus downward or opening valve movement (Fig. 2) is opposed by the action of a valve spring 25, and it will now appear that fluid pressure transmitted through the capillary tubing CT to the chamber 21 will act to urge the diaphragm and follower downwardly (in the drawing), hence with a valve opening action.

The foregoing description of the expansion valve is introduced for completeness, the structure as shown and described being substantially that of a unit of this type sold as the type L valve assembly of Sporlan Valve Company, of St. Louis, Missouri. The valve further includes a portion of a so-called equalizer passage, although in certain installations this may be omitted without affecting current improvements. When employed, the equalizer passage includes a bore 26 extended into a chamber 27 below the follower 22, and is continued outwardly of the body of the valve as through a short horizontal bore 30, thence into the tubing 31 communicating with the inlet end of the evaporator. It will thus appear that the chamber 27 below the follower and diaphragm is subject at all times to pressure conditions existing at the evaporation inlet, which pressure tends to act in conjunction with the spring 25, and tends to bias valve 13 toward closed position against its seat 14.

Figure 3:
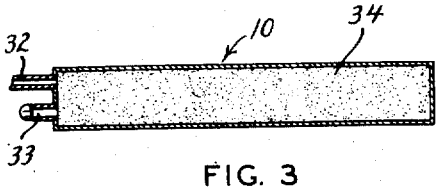
Fig. 3 is a longitudinal section of a thermal responsive bulb to which the improvements are applied in a preferred form.

Referring now more particularly to the structure characterizing the present invention, there is shown by Fig. 3 the elongate tubular bulb heretofore generally indicated at 10. The bulb is as usual, fully enclosed and of sealed construction, and is provided with a single outlet opening 32 being the end of the line of capillary tubing CT. A stub tube is shown at 33, and is utilized only for charging purposes, being sealed off after introduction of the fluid content. The charge, particularly the fluid content of the bulb 10 consists preferably of a fluid having characteristics approaching or identical with those of the refrigerant employed in the system, and will usually consist of Freon 12, methyl chloride or any other of the refrigerants selected for the system according to preference and field of usage. It is assumed that the fluid charge of the bulb 10 and tubing CT will, throughout the temperature range of the system, exist in greater part as vapor, and in lesser part of liquid.

Considering the charge or fill of the unit 10 in a broad sense, this content comprises in the form of Fig. 3, a pulverulent mass which, conveniently at a low cost may consist of a clean high-grade sand, preferably sized to uniformity, and consisting of grains and particles of the order of one-sixteenth inch size as determined by careful screening. This portion of the charge, considered as a solid mass, is preferably free of fines, and the particles or granules are of such size as to avoid their entering any other part of the system. The nature of the granules of this solid part of the charge is inherently such that there will exist only a very limited area of contact of the individual particles, with the thin metal wall of the bulb. Thus there exists only a very limited thermal path between the suction line to which the bulb is attached, and the mass within the tube, indicated at 34. The bulb itself is by preference of the thin wall type and is formed of a highly conductive metal such as copper.

Figure 4:
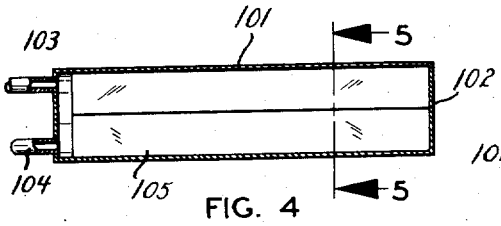
Fig. 4 is a view similar to Fig. 3, but showing a modified form of thermal responsive bulb.

A minor modification of the feeler bulb or thermal sensing unit is shown by Fig. 4, wherein the bulb is or may be of virtually the same construction and material as in that of Fig. 3, the thin conductive wall, preferably metal, being indicated at 101, provided similarly to Fig. 3 with an end closure 102, a connection 103 to line CT, and having a charging tube 104. In this modification a solid mass is provided interiorly of the bulb, and which consists of a rod, preferably of metal and indicated at 105. Although the rod 105 may take any of a variety of forms, it is preferred when using this form, to employ a length of polygonal metal stock, for example, a square section structure such as shown at 105. It will appear that the mass 105 is, similarly to the mass 34, supported and positioned only over a limited area of contact, since it engages the inner wall surface of the bulb along its corner lines. It is preferred to space the element 105 away from one or both end walls of the bulb, and to assure free communication between all parts of the space perimetrally of the element.

Figure 6:
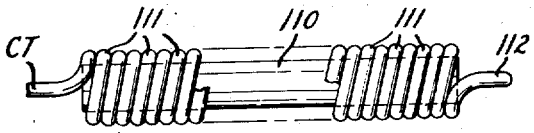
Fig. 6 is a side elevation, with portions broken away for clearness, of a further modified form of thermal responsive bulb.

A further modification which is functionally quite similar to the structures of Figs. 3 and 4, is shown by Fig. 6, wherein the thermal sensing element is a chambered unit consisting of a number of adjacent spiral turns of capillary tubing, these being wound upon and contiguous to a core preferably of metal, and indicated at 110, the several turns of tubing forming in effect a bulb, being indicated at 11. One end of the capillary tubing is indicated at 112, and may be utilized as a charging tube and sealed off after the fill of the chamber formed by the several turns 111, the opposite ends of the tubing being connected to, or forming a continuation of the line CT. It will have appeared that since there is virtually only a line contact between the several turns of tubing 111 and the core 110, the core 110 will function very similarly to in fact identically with the core rod 105 in bulb 101.

It should be noted as relatively unsatisfactory to attempt to augment the mass of the fluid motor system for thermal damping and ballast purposes, by adding such mass to the bulb wall or other thermo sensing structure. While such an element will tend to limit and retard the bulb action, and will tend to reduce hunting somewhat, expediency will result in a difficulty of permitting the liquid refrigerant to slug over into the compressor during certain conditions and incident to sudden reductions in load.

It should be noted that the present invention in the forms described is principally applicable to refrigeration assemblies of so-called gas-charged type, being those in which a limited amount of volatile liquid such as Freon 12 is introduced into the bulb-capillary-diaphragm system and in which there normally exists at least a few drops of the liquid, plus the vapor. The present improvements take advantage of the fact that the liquid will condense and the vapor pressure within the bulb-diaphragm system will correspond to that of the coldest part of this fluid motor assembly, provided only that there be sufficient volume in the cool portion of the system to contain all of the liquid in the system. With the foregoing structure and principles in mind, it will now become apparent that when the temperature of the thermal sensing element such as bulb 10, is rapidly reduced, as at the time of starting up the system or during a sudden reduction in load, the chamber, having a thin highly conductive wall, becomes rapidly cooled. This effects a condensation on the inside of the wall since its temperature is currently the lowest in the motor system. Thus the bulb pressure is correspondingly and quickly reduced. Upon a rapid rise in bulb wall temperature, however, there occurs a distinct lag in a corresponding pressure rise within the fluid motor system. This system is protected against sudden pressure increase by reason of the comparatively large mass within the bulb, cell or tubing 111. By reason of the inherently limited rate of heat rise of this mass, the latter will for some time remain the coldest part of the system, causing the liquid to condense on its surface, and will thus produce a distinct lag in the attainment of maximum vaporization within the motor system, and the low pressure during this period of lag or damping effect, will result in a reduced pressure upon diaphragm 20. Thus there is provided a distinctly delayed and minimized action of the valve incident to any unusual or rapid increase in suction line temperature or superheat. There are thus produced differential rates of action of the valve under opposite conditions.

During periods of normal or steady operation of the system, the damping or ballast mass such as 34, 105, or 110 will attain a substantially steady temperature slightly lower than the temperature of the bulb wall, inasmuch as the latter is influenced not only by the suction line temperature in response to superheat, but also by ambient air temperature. From this it follows that the mass, being contained or virtually contained by the bulb, will after some lag, be influenced by the suction line temperature, but will not be directly affected by the ambient air. It is preferable to provide some contact between the damping and ballast mass, and the bulb wall in the zone or region where the latter lies adjacent or closest to the suction line. This is regarded as a preference in order to operate at the lowest possible temperature of the inert mass, inasmuch as such mass will normally possess the most stable and least fluctuating temperature. If it be assumed as is preferred, that the ballast mass have the lowest temperature of the various parts of the motor system during normal running conditions, the pressure in the bulb-diaphragm system will correspond to the temperature of the ballast mass, and will thus assure the steady or stable operation of the system.

Figure 5:
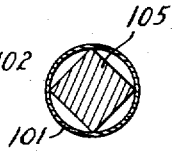
Fig. 5 is a transverse section, taken along line 5—5 of Fig. 4.

From the foregoing it will be seen that this element permits the pressure of the vapor in the motor system to decrease rapidly when the bulb becomes cooler than the thermal stabilizing mass therein, but the vapor pressure will be precluded from increasing rapidly when the bulb is appreciably warmer than the ballast mass. *This result is dependably attained since in each of the several modifications presently shown and described, there is a definitely restricted thermal path between the wall of the bulb and the ballast mass embraced by the bulb. Thus in Fig. 3, the outermost individual grains or particles of the mass 34 will each have little if any more than a point contact with the inside surface of the bulb, and the particles inwardly of the mass will similarly engage each other; similarly, as in the structure of Figs. 4 and 5, the element 105 will contact the inside wall of bulb or cell 101 only along the corner lines of the member 105. In the arrangement of Fig. 6, since the tubing 111 is of approximately circular section, the several turns will actually engage the member 110 only along the spiral line of contact between the tubing and the internal mass. Thus it appears that the ballast mass in each case constitutes an auxiliary, thermally isolated condensing base embraced by the cell.*

*From the foregoing it will appear that incident to any marked degree of drop in suction line temperature, a relatively fast condensation on the inner wall of the bulb will result in a marked and almost instant reduction in temperature and hence in pressure within the cell. However, upon an increase in superheat in the suction line, the change of phase from liquid to vapor within the bulb may be said to occur in two stages. That minor portion of the liquid which is in direct contact with the bulb wall, will very promptly assume a vapor form; however, due to the restricted thermal path between the bulb wall and the ballast mass, such mass and the liquid occluded thereby or in contact therewith, will be very considerably delayed in vaporization. This will of course eventually occur should the suction line temperature remain at a high value. However, because of the delay thus effected in bringing the ballast mass to approach the temperature of the bulb wall, there results a distinctly sequential stage or phase of evaporation of a substantial part of the liquid within the cell.*

*Three factors appear principally to affect performance of the improvements, viz., thermal conductivity of the ballast as compared to that of the bulb; the cross section of the thermal path of the ballast compared to the bulb, and the resistance provided by the thermal path of the ballast. The same amount of liquid contained in the bulb during normal operation will find its way to the coldest region inside the bulb. A discrete mass such as sand, promotes condensation near or at the center of the mass. The speed of temperature change of this center portion depends upon thermal capacity, conductivity of ballast material, cross section of thermal path and resistance to temperature change. Thus, dependent upon other factors noted, it is sometimes possible with good results, that the heat capacity of the ballast, i. e., the product of the specific heat of the ballast material and weight thereof, exceed that of the thin wall bulb. However, fully satisfactory operating results may be attained within the scope of the present improvements, by utilizing a ballast mass having a heat capacity of an order less than that of the bulb, depending upon the nature of the material utilized, the physical nature of the thermal path between*

*parts of the ballast and between ballast and bulb wall, and other conditions discussed.*

It will now be seen that the provision of the interior damping mass as a part of the motor system, serves also to raise the minimum point of the cycle by reducing at desired times the rate of refrigerant feed, and hence overcomes the former tendency of the bulb to overregulate, resulting in feeding some of the liquid refrigerant over into the suction line.

The thermal sensing elements described are the results of numerous experiments with a variety of physical arrangements involving also a variety of materials. As a typical example of the degree of improvement attained, it may be noted that the pressure cycle on a two ton cooler using F-12, has been dependably reduced from 5 lbs. to 1 lb., it being further noted that there is no protracted period of unbalance at times of starting up the system.

It should be noted that the improvement in the steps of automatic control of a system of the type described, involves the addition of no moving parts, and does not necessarily require any special installation or service skill over that required in heretofore conventional installations. Furthermore, and of considerable advantage, is the fact that the present improvements require no added space and no dimensional increase, either in space required for shipment, or that occupied by the bulb in the installation. The invention otherwise fully attains each of several objectives heretofore stated, as well as others implied from the description of the few selected examples.

Although the invention has been described by particularizing the elements and principles of a few selected embodiments, the detail of description is not in any sense to be understood as restricting, numerous variants being possible within the scope of the claims hereunto appended.

I claim as my invention:

1. In a refrigerant system of compressor-condenser-evaporator type, including a thermostatic expansion valve together with a thermal responsive device for actuating the valve, said device including a fluid motor and a fluid-charged thermal sensing unit, means translating fluid expansion within the sensing unit, to the valve for actuation of same, the sensing unit being of chambered characteristic, and a mass of a solid material within the chambered portion of the sensing unit providing an augmented condensing surface and mass, said mass having a predominant proportion of its surface area spaced from the material of the sensing unit and a greater heat capacity than the material of the sensing unit.

2. In a refrigerant system of the compressor-condenser-evaporator type including an expansion valve, a thermal responsive device for actuating the valve, the device including a fluid motor consisting of a hollow thermal sensing element attached to the suction line of the system tubing connected to said element, a diaphragm chamber in connection with said tubing and adjacent the expansion valve, a diaphragm adjacent said chamber and subjected to evaporator pressure, the motor containing a refrigerant fluid charge consisting predominantly of vapor and a mass of solid material within said hollow thermal sensing unit in limited thermal contact therewith and having a greater heat capacity than the material of the unit to produce a lag in the vaporization rate of the refrigerant fluid and hence the charge in the sensing element in response to temperature rises in the suction line.

3. In a refrigerant system of compressor-condenser-evaporator type including a thermostatic expansion valve equipped with a thermal responsive device for actuating the valve, said device including a fluid motor provided with a hollow, thin-wall highly conductive thermal sensing unit, a fluid charge in said unit, means for communicating to the valve motion derived from changes in pressure of said charge, and a mass of solid material predominantly filling said unit, having a greater heat capacity than the material of the unit and being in limited thermal contact therewith to produce a lag in the vaporization rate of the fluid under normal conditions of operation of the system to reduce the frequency and amplitude of cycling effects.

4. The combination in a refrigeration system of compressor-condenser-evaporator type, of a thermostatic expansion valve assembly for controlling the flow of refrigerant to the evaporator, said assembly including a thermal sensing element mounted adjacent the suction line of the system, capillary tubing connecting the expansion valve and said sensing element, the sensing element and tube containing a fluid charge consisting predominantly of a vapor but with a small quantity of liquid, and a mass of solid material within the sensing element having a greater heat capacity than the walls of said element and bearing a limited thermal exchange relation to the suction line through the wall of the sensing element, to produce a lag in the vaporization rate of the fluid within the sensing element in response to suction line temperature increases thereby retarding the action of the expansion valve while permitting a rapid response of said valve upon decrease in temperatures in said suction line.

5. As an article of manufacture, a thermal sensing bulb for actuation of a thermal expansion valve in a refrigerant system of the compressor-condenser-evaporator type, the bulb consisting of a metal cell partially filled with a refrigerant fluid adapted to be located for response to evaporator outlet temperature and connected through tubing to the expansion valve, and a metal rod having a greater heat capacity than the material of the cell within said cell predominantly filling the cell and having a highly restricted path of thermal communication with the wall of said cell.

6. The combination in a compressor-condenser-evaporator refrigeration system, of a thermostatic expansion valve arranged to control the flow of refrigerant to the evaporator, and comprising thermal responsive means arranged to act in accordance with suction line temperature for operating the expansion valve, said means including a thermal sensitive container of a thin-wall conductive material located adjacent the suction line and arranged to be heated and cooled from said line, said container being charged with a volatile and expansive fluid, and a mass within and having restricted thermal communication with the container, and having a greater heat capacity than the material of the container, the mass being of such nature and so related to the container as to effect markedly differential rates of valve opening and closing action in response, respectively, to increases and decreases of suction line temperatures.

*7. As an article of manufacture, a thermal sensing bulb for actuation of a thermal expansion valve in a refrigerant system of the compressor-*

*condenser-evaporator type, the bulb consisting of a metal cell partially filled with a refrigerant fluid adapted to be located for response to evaporator outlet temperature and connected through tubing to the expansion valve, and a metal rod comprising a refrigerant vapor condensing base embraced by and supporting within cell, said rod having a configuration presenting small surfaces in contact with the cell wall to provide a highly restricted path of thermal communication with the wall of said cell.*

*8. In a refrigerant system of the compressor-condenser-evaporator type including a thermostatic expansion valve equipped with a thermal responsive device for actuating the valve, said device including a fluid motor provided with a hollow thin-wall, highly conductive, thermal sensing element, a gas-liquid charge in said element, means for communicating to the valve, motion derived from changes in pressure of said charge, and a thermally isolated vapor condensing base comprising sand occupying a substantial part of the space within said sensing element and being in limited thermal contact therewith to produce a lag in the vaporization rate of the charge under normal conditions of operation of the system to reduce the frequency and amplitude of cycling effects.*

*9. A refrigerant system of the compressor-condenser-evaporator type including a thermostatic expansion valve equipped with a thermal responsive device for actuating the valve, said device including a fluid motor provided with a hollow, thin-wall, highly conductive, thermal sensing element, a gas-liquid charge in said element, means for communicating to the valve, motion derived from changes in pressure of the charge and a thermally isolated condensing base comprising a steel rod occupying a substantial part of the space within said sensing element and being in limited thermal contact therewith to produce a lag in the vaporization rate of the charge under normal conditions of operation of the system to reduce the frequency and amplitude of cycling effects.*

*10. In a refrigerant system of the compressor-condenser-evaporator type including a thermostatic expansion valve equipped with a thermal responsive device for actuating the valve, said device including a fluid motor provided with a hollow, thin-wall, highly conductive, thermal sensing element, a gas-liquid charge in said element, means for communicating to the valve, motion derived from changes in pressure of said charge, and a thermally isolated condensing base comprising an elongated metallic rod substantially rectangular in cross section, the corners only of said rod being in engagement with said element and said rod occupying a substantial part of the space within said sensing element to produce a lag in the evaporation rate of the charge under normal conditions of operation of the system to reduce the frequency and amplitude of the cycling effects.*

*11. As an article of manufacture, a thermal sensing bulb for actuation of a thermal expansion valve in a refrigerant system of the compressor-condenser-evaporator type, said bulb consisting of a metal cell partially filled with a refrigerant fluid adapted to be located for response to evaporator outlet temperature and connected through tubing to the expansion valve, said cell being substantially filled with a refrigerant vapor, a condensing base comprising sand, said base having a highly restricted path of thermal communication with the wall of said cell.*

*12. The combination in a refrigeration system having an evaporator, of an expansion valve arranged to control the flow of refrigerant to the evaporator, a hollow, highly conductive thermal sensing element mounted to respond to variations in evaporator outlet temperature, tubing connecting the expansion valve and the sensing element, a fluid charge in said tubing and said element under a pressure such that at a temperature within the range of operating temperature of the evaporator some of the charge is in a liquid state, and a mass of solid material within said element in contact with said charge and bearing a thermal relation to the element such as to delay temperature equalization between said mass and said element upon changes in evaporator outlet temperature for producing a lag in the pressure increase of said charge in response to evaporator outlet temperature increases while permitting rapid pressure decrease of the charge in response to evaporator outlet temperature reductions.*

*13. The combination according to claim 12 in which said mass of solid material is highly liquid absorbent and relatively inert.*

HAROLD T. LANGE.

References Cited in the file of this patent or the original patent

UNITED STATES PATENTS

| Number | Name | Date |
|---|---|---|
| 1,521,985 | Bastian | Jan. 6, 1925 |
| 2,037,949 | Tate | Apr. 21, 1936 |
| 2,221,633 | Dasher | Nov. 12, 1940 |
| 2,242,334 | Wile | May 20, 1941 |
| 2,243,355 | Olson | May 27, 1941 |
| 2,309,405 | Matteson | Jan. 26, 1943 |
| 2,355,043 | Adlam | Aug. 8, 1944 |
| 2,368,592 | Dillman | Jan. 3, 1945 |
| 2,385,243 | Wiegers | Sept. 18, 1945 |
| 2,577,902 | McGrath | Dec. 11, 1952 |